US00RE43751E

(19) United States
(12) Reissued Patent
Tange

(10) Patent Number: US RE43,751 E
(45) Date of Reissued Patent: Oct. 16, 2012

(54) BROWSER SYSTEM HAVING SIMPLIFIED URL ADDRESS REGISTERING METHOD

(75) Inventor: Akira Tange, Tokyo (JP)

(73) Assignee: Sony Corporation, Tokyo (JP)

(21) Appl. No.: 11/109,881

(22) Filed: Apr. 18, 2005

Related U.S. Patent Documents

Reissue of:
(64) Patent No.: 6,707,468
Issued: Mar. 16, 2004
Appl. No.: 10/132,802
Filed: Apr. 25, 2002

U.S. Applications:
(62) Division of application No. 09/065,433, filed on Apr. 24, 1998, now Pat. No. 6,483,525.

(30) Foreign Application Priority Data

Apr. 30, 1997 (JP) ..... P09-113132

(51) Int. Cl.
*G06F 15/16* (2006.01)
*G09G 5/00* (2006.01)

(52) U.S. Cl. ..... 709/217; 709/203; 715/738; 715/739

(58) Field of Classification Search ..... 709/202–203, 709/217–219, 245–246; 715/733–734, 738–739, 715/835
See application file for complete search history.

(56) References Cited

U.S. PATENT DOCUMENTS 5,630,042 A 5/1997 McIntosh et al.

(Continued)

FOREIGN PATENT DOCUMENTS

EP 0717342 6/1996

OTHER PUBLICATIONS

Kengo Inoue, "Internet that is not late even if now" [No. 7], Nikkei Personal Computing, Japan Nikkei BP, Jan. 13, 1997, vol. 280, pp. 240-243.

(Continued)

*Primary Examiner* — Bharat N Barot
(74) *Attorney, Agent, or Firm* — Oblon, Spivak, McClelland, Maier & Neustadt, L.L.P.

(57) ABSTRACT

[The present invention relates to a browser apparatus for browsing a variety of homepages supplied from servers over e.g. the Internet. In the browser apparatus, the address of a homepage is classified and registered through a user carrying out with a mouse a drag-and-drop action of its pointer to shift an item displayed in a region of the screen where the homepage is displayed to one of classifications determined by the user and displayed on the screen. This allows the registration of e.g. a homepage address to be much simplified.] *A browser apparatus includes a display unit having a screen including a first region for displaying data supplied from a server and a second region for displaying an icon image. The browser apparatus also includes a commander responsive to an action for controlling a pointer displayed on the screen. The browser apparatus further includes a controller responsive to a selected icon image displayed in the second region, selected by the commander for displaying a pull-down menu having a title list associated with URL addresses and responsive to a title selected from the pull-down menu by the commander for accessing a URL address associated with the selected title and displaying data supplied from the server corresponding to the accessed URL address in the first region. The icon image is displayed in the second region when the data supplied from the accessed URL address is displayed in the first region.*

23 Claims, 10 Drawing Sheets

U.S. PATENT DOCUMENTS

| | | | | |
|---|---|---|---|---|
| 5,742,768 | A | 4/1998 | Gennaro et al. | |
| 5,768,578 | A | 6/1998 | Kirk et al. | |
| 5,784,058 | A | 7/1998 | LaStrange et al. | |
| 5,801,702 | A | 9/1998 | Dolan et al. | |
| 5,808,613 | A | 9/1998 | Marrin et al. | |
| 5,848,424 | A | 12/1998 | Scheinkman et al. | |
| 5,893,915 | A | 4/1999 | Cordell et al. | |
| 5,914,714 | A | 6/1999 | Brown | |
| 5,917,491 | A * | 6/1999 | Bauersfeld | 715/810 |
| 5,918,237 | A | 6/1999 | Montalbano | |
| 5,923,885 | A * | 7/1999 | Johnson et al. | 715/738 |
| 5,937,163 | A | 8/1999 | Lee et al. | |
| 5,983,245 | A | 11/1999 | Newman et al. | |
| 6,021,435 | A | 2/2000 | Nielsen | |
| 6,049,812 | A | 4/2000 | Bertram et al. | |
| 6,068,188 | A | 5/2000 | Knowles | |
| 6,091,409 | A | 7/2000 | Dickman et al. | |
| 6,119,135 | A | 9/2000 | Helfman | |
| 6,483,525 | B1 * | 11/2002 | Tange | 715/765 |
| 6,707,468 | B2 * | 3/2004 | Tange | 715/739 |
| 7,043,526 | B1 * | 5/2006 | Wolfe | 709/203 |

OTHER PUBLICATIONS

Shiro Tachimoto, "Comfortable Internet life by leaning navigator", Nikkei Personal Computing, Japanese Nikkei BP, Feb. 26, 1996, vol. 259, pp. 214-222.

Robert Lauriston, "Netscape Communicator", Nikkei Personal Computing, Japan, Nikkei BP, No. 282, Feb. 10, 1997, pp. 223-228.

Pete Lonshin, "Internet communicator Par Exellence", BYTE.com, Mar. 1997, pp. 1-3.

Nathan Moinvaziri, "Netscape 4.0 Tricks", Newsgroups: comp.lang. javascript, Dec. 30, 1996, pp. 1-2.

Search Report issued Mar. 23, 2011, in European Patent Application No. 10010577.4-2201 / 2278503.

"Netscape Navigator Help File (C:/ProgramFiles/Netscape/Communicator/Program/NetHelp/Webhome.htm)", Internet Citation, Netscape Communicator Version 4.0 Preview Release 2 for Win95/NT., XP002626314, Feb. 22, 1997, 47 pages, sillydog.org/pub/ns4/w32/c32e40b2.exe.

Guide to What's New: Netscape Communicator, Internet Citation, XP007917372, Dec. 30, 1996, 21 pages, web.archive.org/web/19961230204630/ netscape.com/com prod/products/communicator/guide.html.

European Office Action (Decision to Refuse) issued Nov. 11, 2011, in Patent Application No. 98303174.1.

Elizabeth M. Choinski, et al., "High Marks for SmartMarks (A New Bookmarks Organizer from Netscape): A Review Article", Internet Reference Services Quarterly, vol. 1, No. 3, XP000865762, 1996, pp. 117-123.

R. Colin Johnson, "Bookmark Organizer Ready", Electronic Enigneering Times, No. 859, XP002917493, Jul. 31, 1995, p. 140, 2 sheets.

"Netscape SmartMarks, Smart Bookmarks", Netscape Communications Corp., PC Magazine, May 14, 1996, 3 sheets.

"Organizing Bookmarks at the Time of Creation", Research Disclosure, XP002132686, Apr. 1, 1998, p. 495.

M. R. Brown, "Special Edition: Using Netscape™ 2", A Special Edition using Netscape, XX, XX, Jan. 1, 1995, XP002244732, pp. 148-175, 220-228, 231-253, 678 and 679.

* cited by examiner

BROWSER SYSTEM HAVING SIMPLIFIED URL ADDRESS REGISTERING METHOD

Matter enclosed in heavy brackets [ ] appears in the original patent but forms no part of this reissue specification; matter printed in italics indicates the additions made by reissue.

This is a divisional of prior application Ser. No. 09/065,433 filed Apr. 24, 1998 now U.S. Pat. No. 6,483,525.

BACKGROUND OF THE INVENTION

1. Field of the Invention

The present invention relates to a browser apparatus connected to a server for providing information.

2. Description of Related Art

A browser apparatus such as a personal computer equipped with a software for browsing homepages offered by multiple servers on a network, e.g. the Internet, is provided having a so-called footmark function for saving the URL (uniform resource locator) address of each homepage of the server on the Internet.

When the address of a desired homepage to be accessed frequently has been registered by a user to his or her browser apparatus, the homepage can readily be viewed without manually entering the address e.g. through a keyboard. The name and address of the homepage once registered in advance can be selected and called for by the user easily operating e.g. a mouse.

Also, a list of classifications including various categories of sports, news, entertainments, and others is determined by a user for case of the browsing of homepages and used for assigning a desired classification to the address of each homepage for registration.

A procedure of registering the address of a homepage to one of the classifications is now explained referring to FIGS. 1 to 4.

As shown in FIG. 1, the procedure starts with Step S20 where a user accesses through a browser apparatus 12 to a desired homepage of a server. Then, the homepage of the server appears in a homepage display area 31 of a window 30 displayed on a display unit of the browser apparatus as shown in FIG. 2. Simultaneously, the address of the homepage is displayed in an address display area 32.

This is followed by Step S21 where a homepage menu 34 on a menu bar 33 is selected by the user operating an input device which is a pointing device such as a mouse or a touchpanel pen. Then, a pulldown menu 35 appears at Step S22.

When an extra menu 36 in the pulldown menu 35 is selected at Step S23, a dialogue box 37 shown in FIG. 3 is displayed over the window 30 at Step S24.

When a classification button 38 in the dialogue box 37 is enabled by the user at Step S25, a list of classifications 39 shown in FIG. 4 appears at Step S26. The list of classifications 39 includes a number of the classifications 40 predetermined and registered as well as names or addresses of the homepages which have been unclassified and unregistered.

When a desired one of the classifications 40 in the list of classifications 39 is selected and an OK button 41 is clicked by at Step S27, the address of the homepage being accessed and displayed in the address display area 32, shown in FIG. 2, is registered to the classification at Step S28.

As understood, the above procedure of classifying and registering an address corresponding to each data supplied from a server requires a redundancy of steps.

The list of classifications 39 shown in FIG. 4 is displayed in the form of a tree of classification levels and may extend downwardly in the window 30 as the items of classification are increased thus overlapping the other areas of the window 30 and impairing the appearance.

SUMMARY OF THE INVENTION

An object of the present invention is to provide a browser apparatus, an address registering method, and a browser system in which the classification and registration of an address corresponding to a data supplied from a server can be carried out by a user operating a simpler procedure without troublesome rules.

For achievement of the above object of the present invention, a browser apparatus for displaying a data supplied from a server over a communication means is provided having a classification unit for assigning at least one of classifications to the data supplied from the server, a memory for storing an address corresponding to the data as well as the classification determined by the classification unit, a display unit for displaying the data supplied from the server in a first region of the screen and the classification of the data in a second region of the same, a command unit responsive to the action of a user for controlling the location of a pointer displayed on the screen of the display unit, and a control means responsive to shift of the pointer from the first region to the second region of the screen by the command unit for storing an address corresponding to the data displayed in the first region into the memory in association with its classification displayed in the second region.

For achievement of the above object of the present invention, an address registering method is provided comprising the steps of displaying a data supplied from a server in a first region of the screen of a display unit and classifications for the data in a second region of the same, and carrying out a drag-and-drop action to shift from any desired point in the first region to one of the classifications displayed in the second region so that an address corresponding to the data displayed in the first region is stored into a memory in association with its classification.

For achievement of the above object of the present invention, a browser system is provided having a server for supplying a data, a classification unit for assigning at least one of classifications to the data supplied from the server, a memory for storing an address corresponding to the data as well as the classification determined by the classification unit, a display unit for displaying the data supplied from the server in a first region of the screen and the classification of the data in a second region of the same, a command unit responsive to the action of a user for controlling the location of a pointer displayed on the screen of the display unit, and a control unit responsive to shift of the pointer from the first region to the second region of the screen by the command unit for storing an address corresponding to the data displayed in the first region into the memory in association with its classification displayed in the second region.

DESCRIPTION OF PREFERRED EMBODIMENTS

A browser apparatus, an address registering method, and a browser system according to the present invention will be described in more detail referring to the accompanying drawings.

Figure 1:
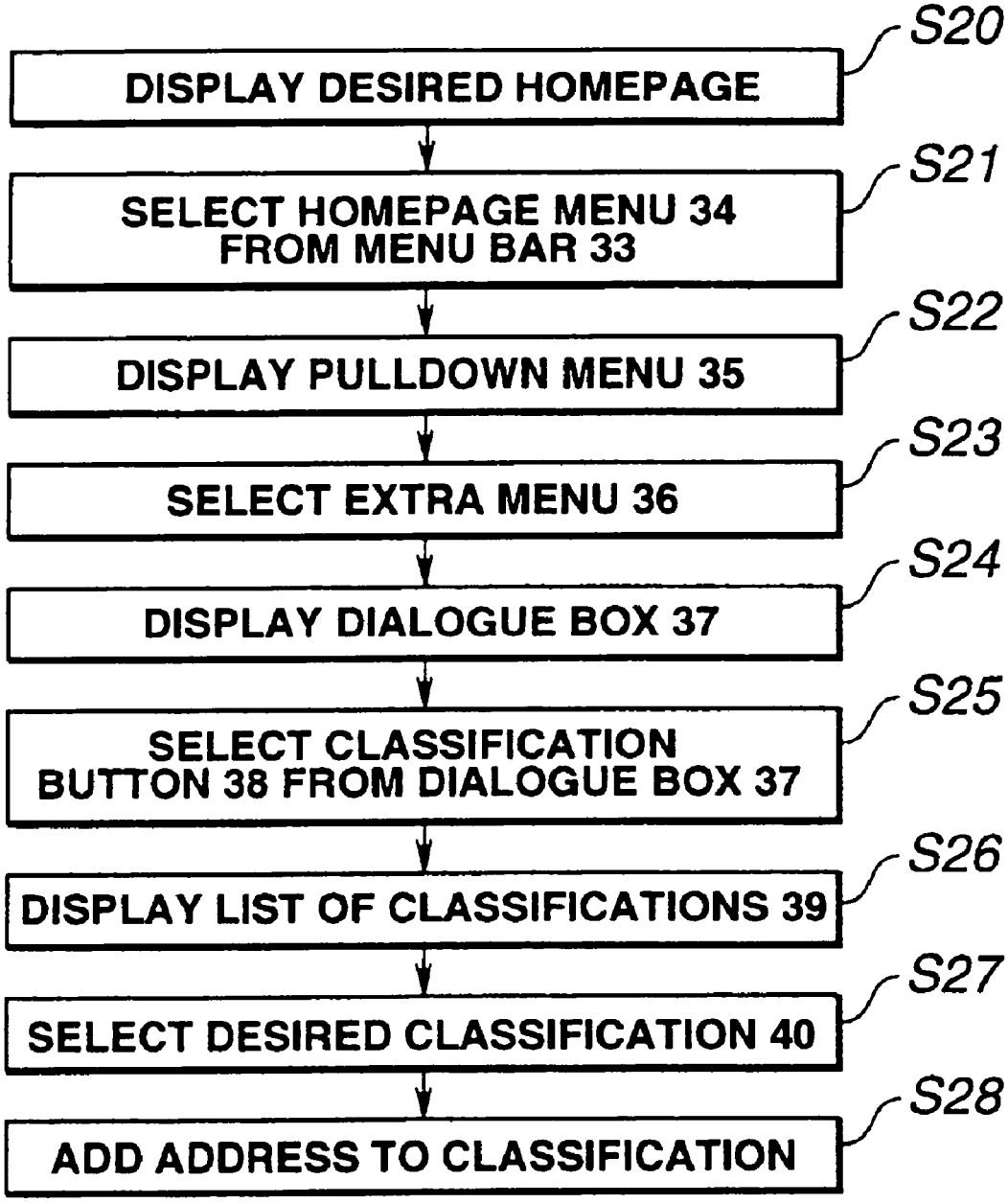
FIG. 1 is a flowchart showing a conventional procedure of address registration.
Figure 2:
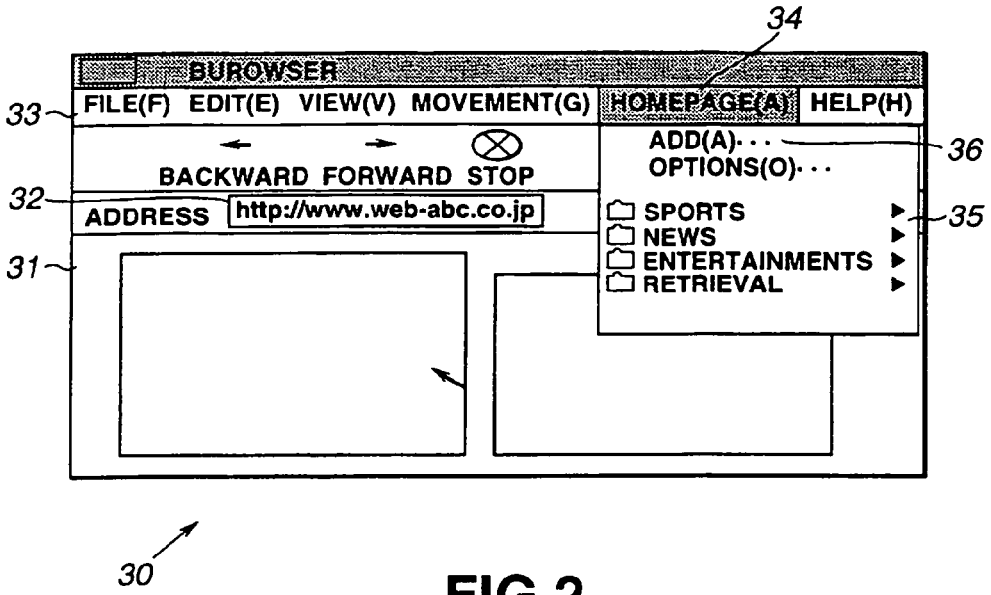
FIG. 2 is a view showing a window displayed on a display of a conventional browser apparatus.
Figure 3:
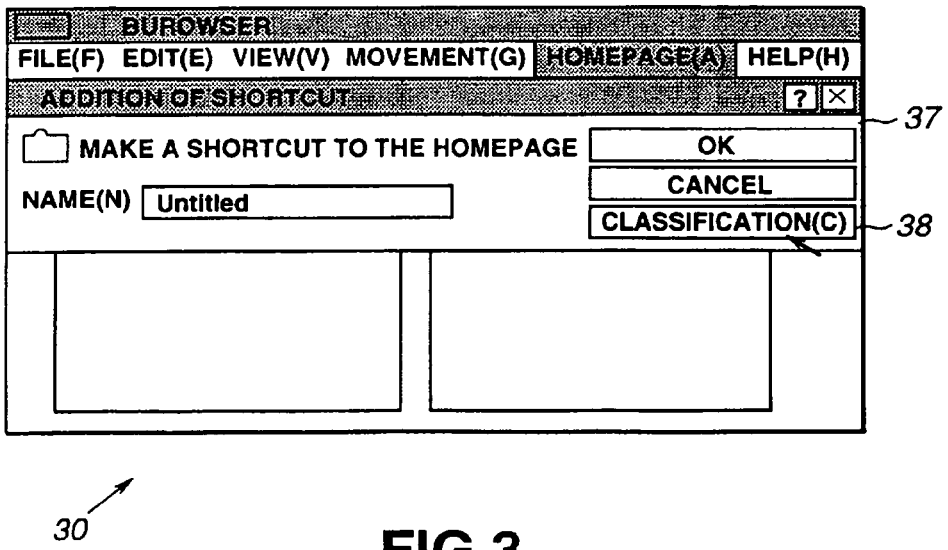
FIG. 3 is a view of the conventional window showing an address registration dialogue box.
Figure 4:
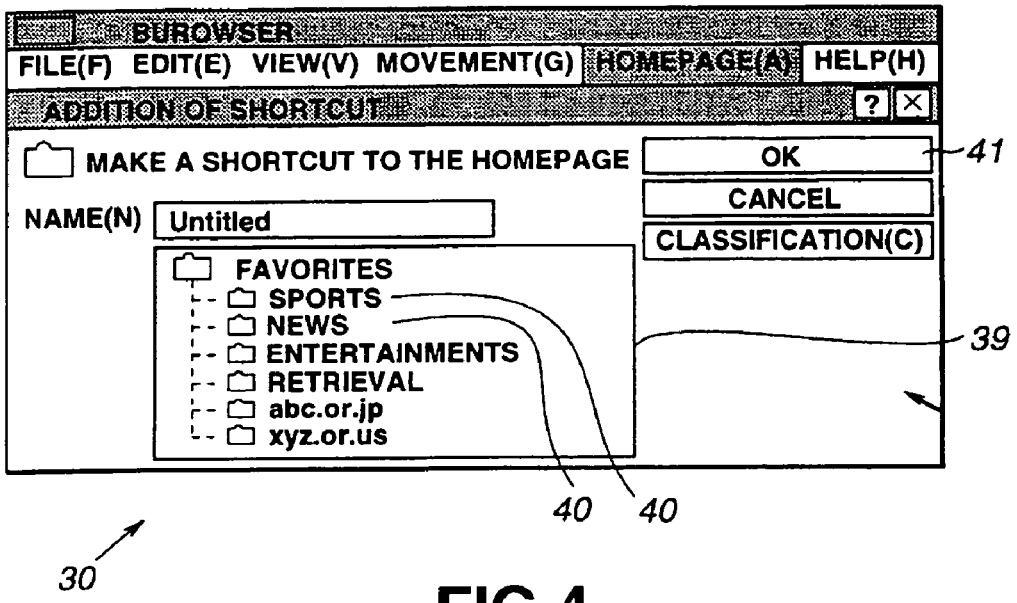
FIG. 4 is a view of the conventional window showing a list of classifications.
Figure 5:
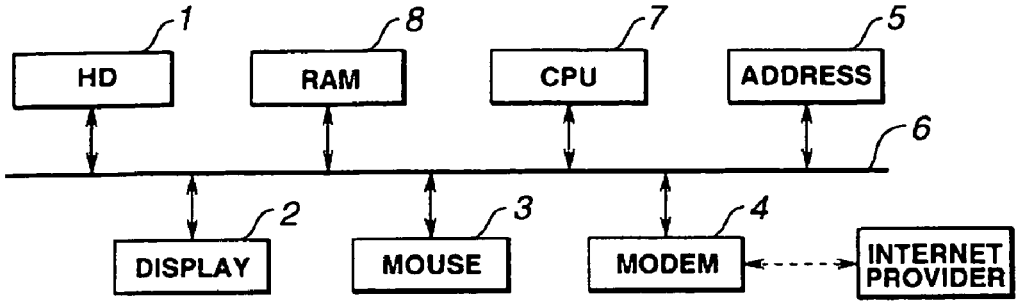
FIG. 5 is diagram showing an arrangement of a browser apparatus according to the present invention.

The browser apparatus according to the present invention comprises such a personal computer as shown in FIG. 5 including a hard disk 1 for storing a program of operating the browser apparatus, a display 2 responsive to the program for displaying graphical user interface (abbreviated to GUI hereinafter), a mouse 3 manipulated by a user for controlling the browser apparatus through the GUI, a modem 4 for communication with a server which provides accessible image data over the Internet, and an address storage 5 for storing the address of each homepage which is composed of image data and/or text data.

The above components of the browser apparatus are controlled via a bus by a central processing unit 7 (abbreviated to CPU hereinafter).

Upon receiving a command for starting the browser apparatus is entered through the mouse 3 or an unshown input device such as a keyboard, a touchpanel, the CPU 7 reads a corresponding one of the file programs stored in the hard disk 1 and transfers it to a random access memory 8 (abbreviated to RAM hereinafter) for execution of the program. The program may be saved on any appropriate recording medium such as a floppy disk or an optomagnetic disk. According to the program, the CPU 7 displays via the bus 6 on the display 2 a GUI data which will be explained later.

The browser apparatus is connected at its modem 4 via e.g. a telephone line and a provider to servers at the other end of the line on the Internet or a type of network. In this embodiment, the connection to the provider on the Internet is automatically enabled when the browser apparatus is energized. It is however possible that the connection to the provider is enabled by the user viewing the GUI screen on the display 2 and operating a given action.

The modem 4 converts a digital signal of data such as the address of a homepage into an analog signal suited for transmission along a normal telephone line and delivers the analog signal to a provider on the Internet over the telephone line. The modem 4 also demodulates an analog signal e.g. of image data received from the Internet provider to a digital signal processable in the browser apparatus. Although the transmission is made over the telephone line in the form of an analog signal in this embodiment, digital signals may directly be transmitted and received with the use of a terminal adaptor over an applicable integrated service digital network (ISDN) or the like.

The browser apparatus connected to the Internet provider allows the user to download and browse various homepages offered by a number of servers on the Internet. To do so, the user first enters a keyword to access the Internet provider and types the address of a desired homepage to be viewed through the input device such as a keyboard not shown. The address of the homepage to be viewed repeatedly may be saved in the address storage 5 which comprises e.g. a RAM. The registration of the address of the homepage will be explained later.

When the address of a homepage is saved in the address storage 5, it can freely be named by the user. This allows the browser to save and control a plurality of the addresses by their names which can easily be identified by the user.

Figure 6:
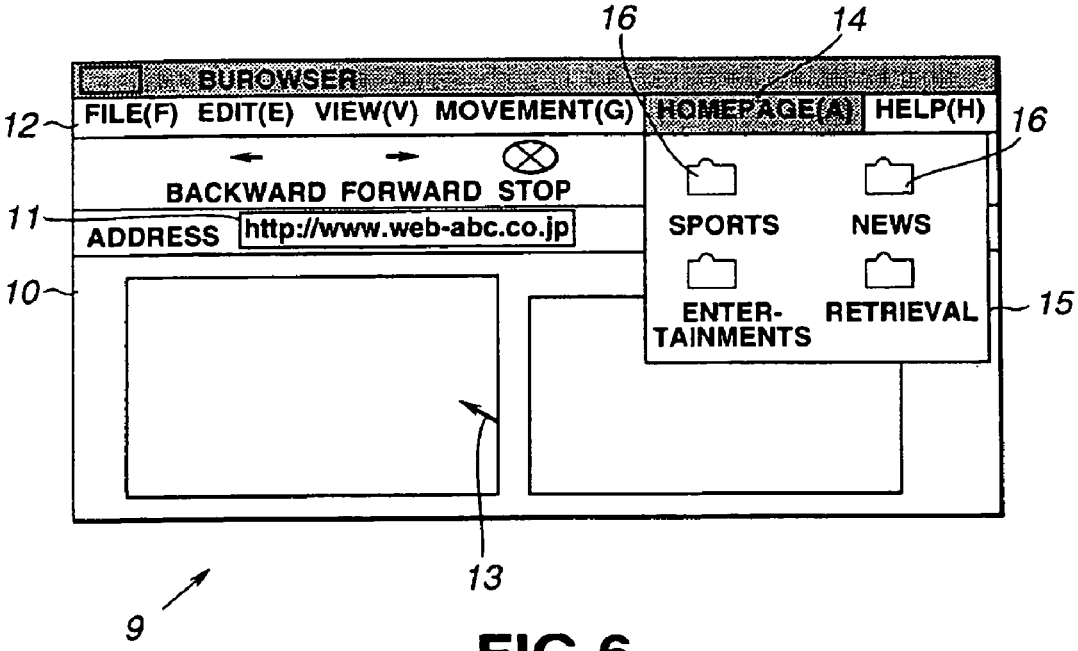
FIG. 6 is a view showing a window for displaying a set of folder icons of classification.

The GUI screen displayed on the display 2 of the browser apparatus is implemented in the form of a browser window 9, shown in FIG. 6, which includes a homepage display area 10 or a first viewport in the screen for displaying a homepage supplied from the server in access, an address display area 11 for displaying the addresses of homepages, and a menu bar 12 used by the user for selecting a variety of functions.

A pointer 13 operated by the mouse 3 shown in FIG. 5 is also displayed over the browser window 9. The user can operate the mouse 3 to move the pointer 13 to a desired location on the GUI screen for selectively carrying out the various functions.

Figure 7:
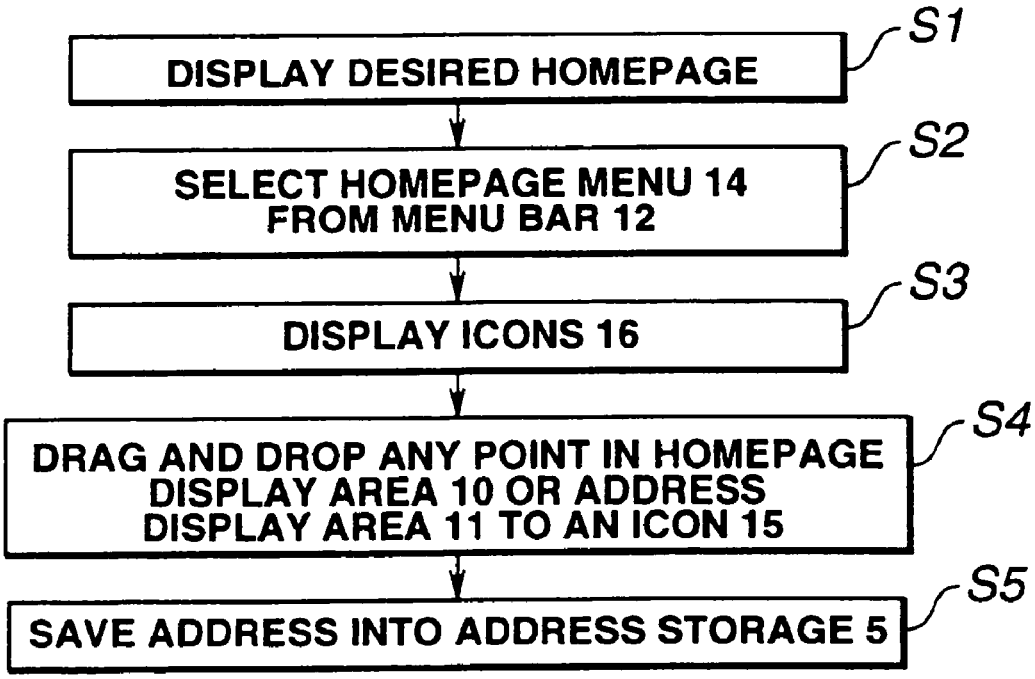
FIG. 7 is a flowchart showing a procedure of registering an address to the folder icon of classification.

A procedure of storing the address of a homepage in the address storage 5 by the user is now explained in conjunction with a flowchart of FIG. 7. The explanation will also refer to FIGS. 5 and 6 as necessary.

The procedure starts with Step S1 where in response to the access of the user to a desired homepage from a server, data of the homepage is displayed on the homepage display area 10. Simultaneously, the address of the homepage in access appears on the address display area 11.

At Step S2, a homepage menu 14 is selected by the user operating the mouse 3. Then, the CPU 7 displays a pulldown menu 15 of a second viewport at Step S3 where a group of classifications predetermined by the user appear e.g. as folder icons 16.

At Step S4, the pointer 13 is operated by the user for drag-and-drop action from any item in the homepage display area 10 or the address display area 11 to a desired one of the icons 16. More particularly, the user presses down a buttonswitch of the mouse 3 with the pointer 13 moved and located at the item in the homepage display area 10 or the address display area 11, while the buttonswitch remaining pressed down, drives the pointer 13 to the icon 16, and releases the buttonswitch of the mouse 3 at the icon 16.

It is noted that although a standard pulldown menu disappear when any other location is selected, the pulldown menu 15 in the browser apparatus of the embodiment remains displayed when the homepage display area 10 or the address display area 11 is selected. The pulldown menu 15 may be adapted for appearing when the homepage display area 10 or the address display area 11 is selected.

At Step S5, the CPU 7 upon receiving an input signal from the mouse 3 operated by the user saves the address of the homepage in display in the address storage 5 in association with a corresponding one of the classifications predetermined by the user. When the pointer 13 controlled by the user operating the mouse 3 is driven by drag-and-drop with no relation of the classification in the pulldown menu 15, the address of the homepage is not classified but stored in the address storage 5. At the time, data of the homepages such as a list of homepage names stored is displayed beside the classification icons in the pulldown menu 15.

Accordingly, the browser apparatus of the present invention allows the address of a homepage being accessed to be saved in the address storage in association with its classification through a simple operation.

Figure 8:
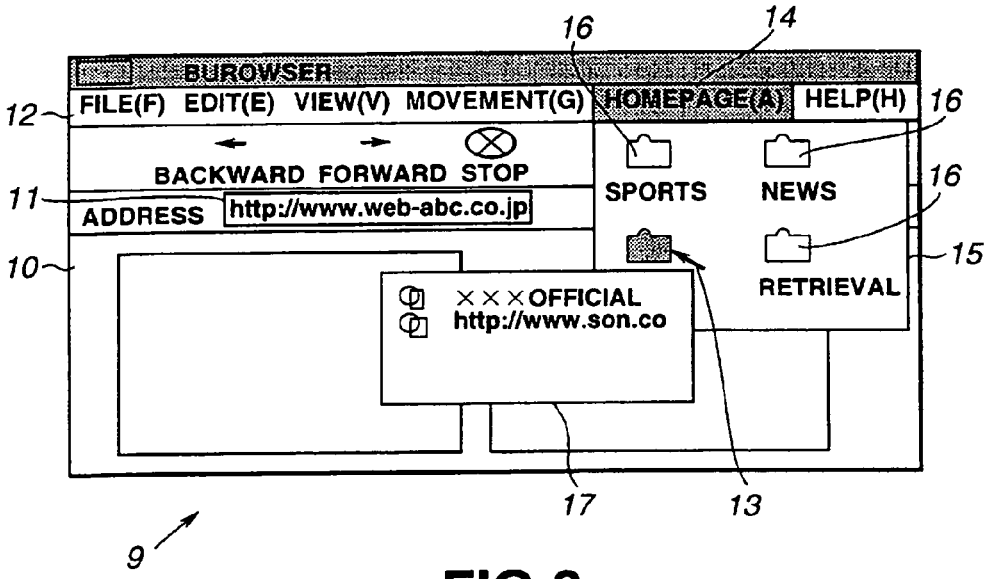
FIG. 8 is a diagram of the window when an address is selected from the folder icons of classification.
Figure 9:
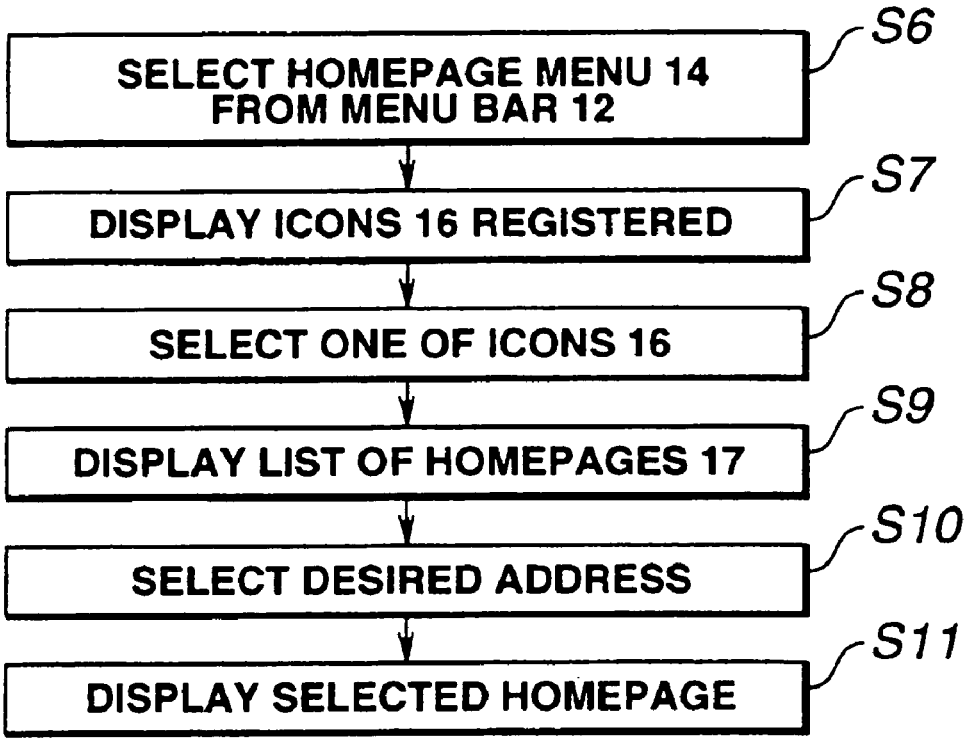
FIG. 9 is a flowchart showing a procedure of selecting the address from the folder icons of classification.

A procedure of reviewing the homepage from a server of which address has been registered by the prescribed procedure is explained referring to FIGS. 8 and 9. A browser window 9 shown in FIG. 8 is identical to that shown in FIG. 6 and like items are denoted by like numerals and will be explained in no more detail.

At Step S6 shown in FIG. 9, the homepage menu 14 is selected by the user controlling the menu bar 12. This is followed by Step S7 where the pulldown menu 15 is displayed by the CPU 7 and the icons 16 appear on the screen.

At Step S8, one of the icon 16 corresponding to the address of a desired homepage which has been registered and saved is selected by the user. Then, Step S9 follows where the CPU 7 displays a list of the homepages 17 as shown in FIG. 8. The list of the homepages 17 includes addresses or names of the homepages registered by the classifications determined by the user and denoted with the coins 16.

At Step S10, the address of the desired homepage is selected by the user by identifying the address or name in the list of the homepages. Step S11 then follows where the CPU 7 retrieves the address of the desired homepage identified by the address or name from the address storage 5 shown in FIG. 5 and displays the desired homepage defined by the address in the homepage display area 10.

This allows the user to view a desired homepage by carrying out the simple procedure with the mouse 3 of selecting the homepage menu 14, clicking the icon 16, and identifying the address of the desired homepage.

The classification may further be classified into lower subjects for convenience of the user. For example, it may be arranged that when any of the icons 16 is selected, another list of icons for lower classification is displayed.

Figure 10:
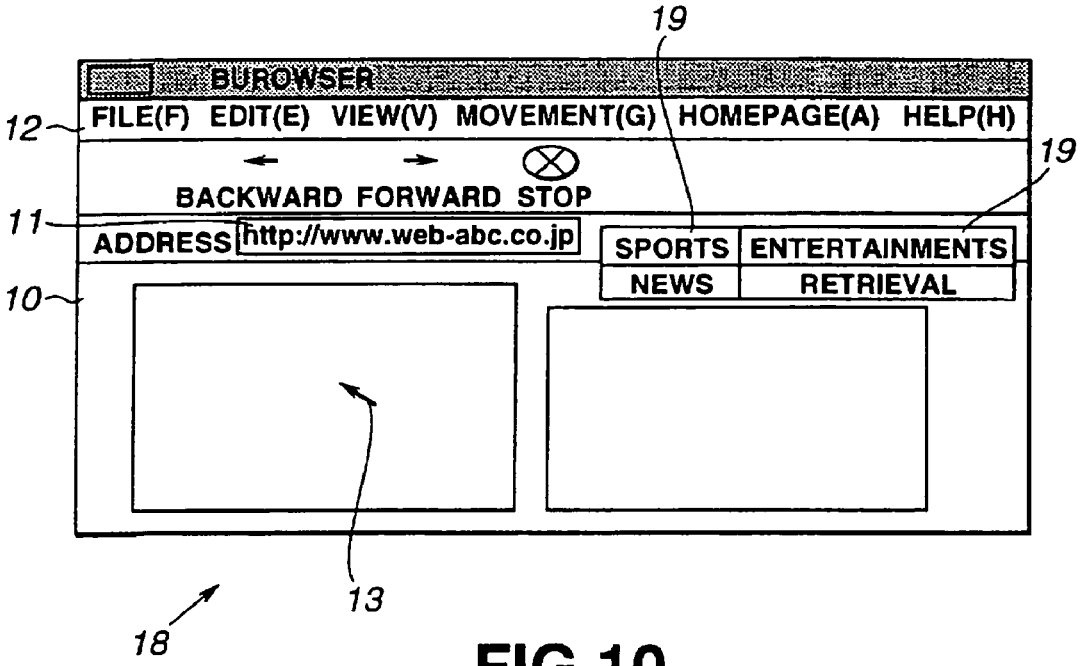
FIG. 10 is a view showing a window for displaying a set of button icons of classification.

FIG. 10 illustrates a modification of the GUI screen to be displayed on the display 2 of the browser apparatus of the present invention. In a browser window 18 shown in FIG. 10, like items are denoted by like numerals as those of the browser window 9 shown in FIG. 6 and will be explained in no more detail. While the browser window 9 shown in FIG. 6 exhibits the folder icons 16 in the pulldown menu 15, the browser window 18 shown in FIG. 10 provides an array of button icons 19 indicative of classifications of the address.

Although the button icons 19 are shown in two lines and two rows, they may be aligned in a vertical or horizontal single row and may be of a desired shape and size. The button icons 19 may be moved and placed to any location in the browser window 18 at the user's option. Also, it is possible to display the button icons 19 over another application or an OS system.

Figure 11:
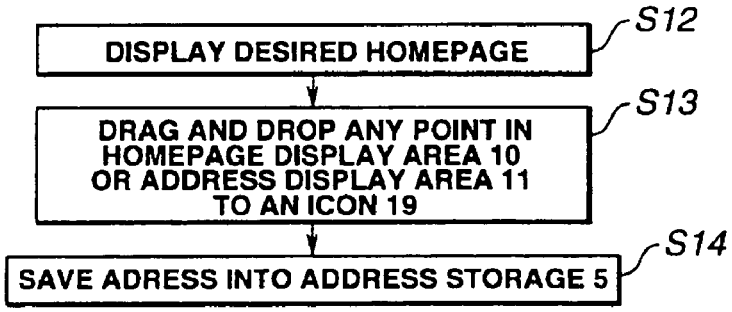
FIG. 11 is a flowchart showing a procedure of registering an address to the button icon of classification.

A procedure of storing the address of a homepage in the address storage 5 by the user using the browser window 18 is now explained referring to a flowchart of FIG. 11. The explanation also refers to FIGS. 5 and 10 as necessary.

At Step S12, a desired homepage is displayed in the homepage display area 10 by the user. Simultaneously, the address of the homepage displayed in the homepage display area 10 also appears in the address display area 11.

This is followed by Step S13 where any desired item in the homepage display area 10 or the address display area 11 is moved to a corresponding one of the icons 19 by a drag-and-drop action of the user. At Step S14, the CPU 7 saves the address of the homepage being displayed into the address storage 5 in association with its classification determined by the user. When the pointer 13 is shifted by the drag-and-drop action to any location in the browser window but not of the classification, the address of the homepage in display is unclassified and saved in the address storage 5 and also, a list of the homepages of which addresses have been saved, such as a list of their names in the form of button icons, is displayed in a part of the browser window, e.g. on the right side of the address display area 11.

Since the icons 19 for the classifications are being displayed constantly, the callback of the pulldown menu is eliminated and the procedure of registering the address of a homepage will hence be simplified.

Figure 12:
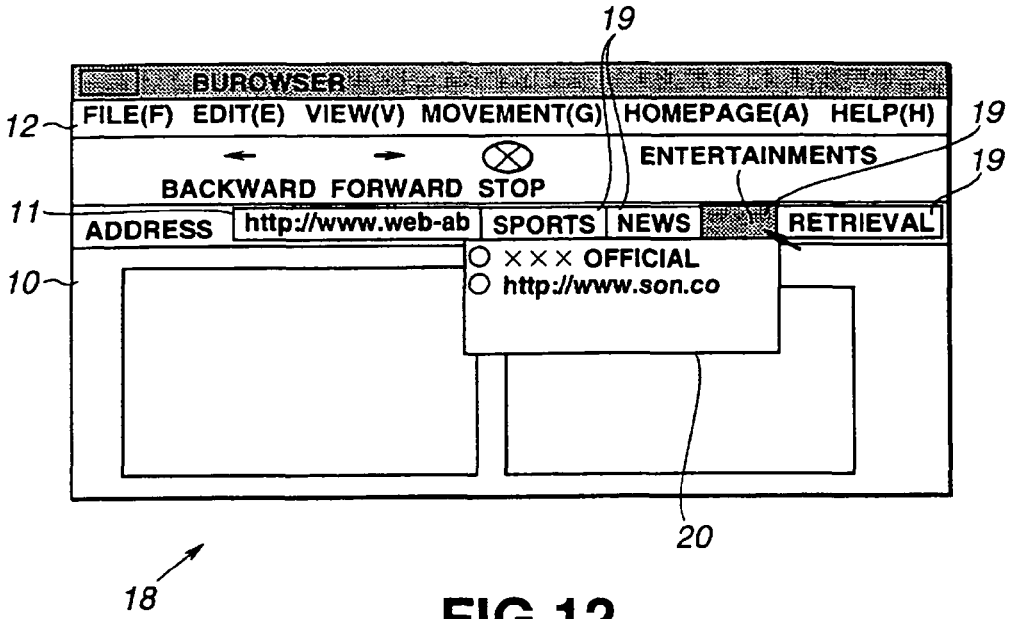
FIG. 12 is a diagram of the window when an address is selected from the button icons of classification.
Figure 13:
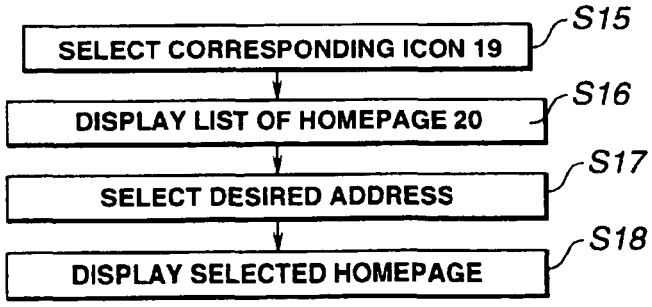
FIG. 13 is a flowchart showing a procedure of selecting the address from the button icons of classification.

A procedure of reviewing a desired homepage of which address has been registered by the prescribed procedure on the GUI screen 18 is explained referring to FIGS. 12 and 13. A browser window 18 shown in FIG. 12 is identical to that shown in FIG. 10 and like items are denoted by like numerals and will be explained in no more detail. In the browser window 18 shown in FIG. 12, icons 19 are aligned in a horizontal row.

At Step S15, a desired one of the icons 19 is selected by the user. Then, Step S16 follows where the CPU 7 displays a list of homepages 20, shown in FIG. 12, which consists of the address or name of each homepage registered in the classifications denoted by the icons 19.

At Step S17, the address or name of a desired homepage is selected by the user from the list of the homepages 20 displayed. This is followed by Step S18 where the CPU 7 retrieves the address of the selected homepage or the address corresponding to the name of the homepage from the address storage 5 and displays the homepage in the homepage display area 10.

This permits the user to review a desired homepage by carrying out with the mouse the simple procedure of selecting the icon 19 and clicking the address of the homepage. More specifically, the icons 19 representing the classifications of the homepages are constantly displayed, the procedure of calling and reviewing a desired homepage will be more simplified than that explained with FIGS. 8 and 9.

It may be arranged that the icons 19 disappear in a common mode and is called and displayed automatically when any point in the homepage display area 10 or the address display area is clicked. This allows the registration of the address of a homepage to be executed by a manner similar to the simple procedure shown in the flowchart of FIG. 11. As the icons 19 are not displayed in the common mode, they never overlap nor disturb any portion of the homepage display area 10. In the embodiment shown in FIG. 6, the pulldown menu 15 may be adapted for appearing automatically upon the user clicking any point in the homepage display area 10 or the address display area 11.

Figure 14:
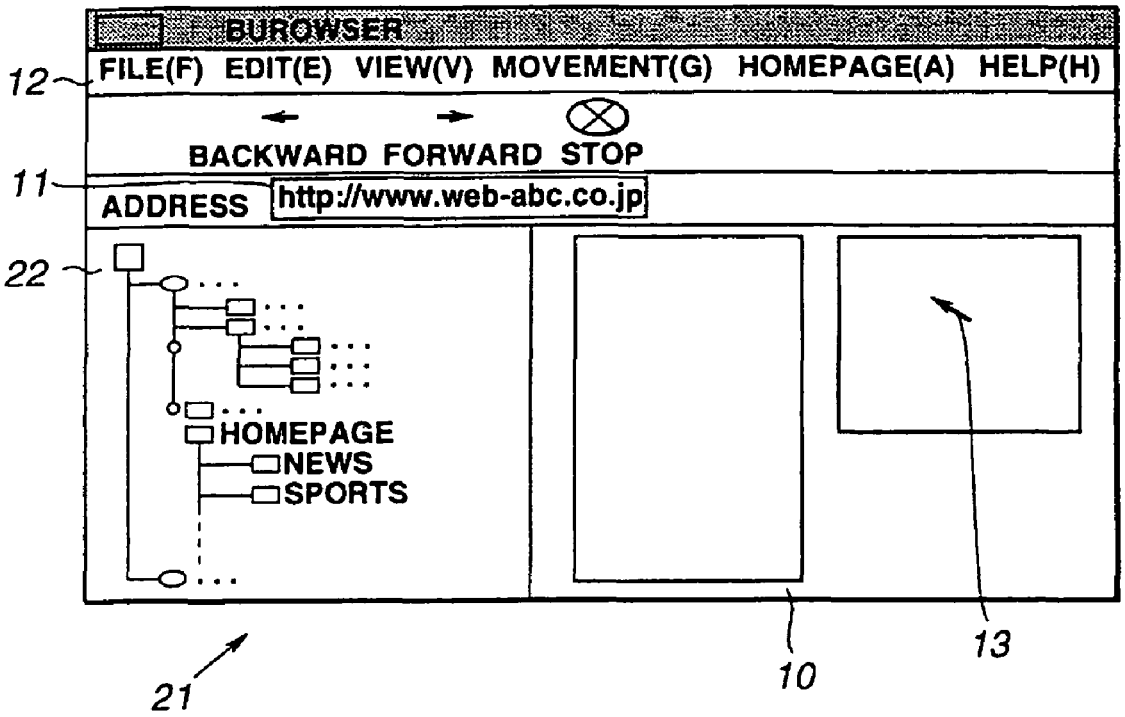
FIG. 14 is a view showing a modification of the window.

FIG. 14 illustrates another modification of the GUI screen displayed on the display 2 of the browser apparatus of the present invention. In a browser window 21 shown in FIG. 14, like items are denoted by like numerals as those of the browser window 9 shown in FIG. 6 and will be explained in no more detail. The browser window 21 includes a homepage display area 10, an address display area 11, and a file display area 22. The file display area 22 is provided for displaying a tree of files and directories assigned to the hard disk 1, the address storage 5, and other auxiliary storage devices in the browser apparatus.

The classifications are displayed as subdirectories of each homepage directory in the file display area 22. The directories may be expressed by corresponding folder icons.

For registering the address of a homepage being displayed in the homepage display area 10 by the user using the window 21, any item in the homepage display area 10 or the address display area 11 is selected and moved by operating the mouse 3 to a corresponding one of the folder icons in the file display area 22 which represents the target directory. Accordingly, the browser apparatus saves the address of the homepage displayed in the address display area 11 into the address storage 5 shown in FIG. 5 in association with its classification.

Although the browser apparatus explained has the hard disk 1 and the address storage 5 mounted separately, the hard disk 1 may be installed in the address storage 5 shown in FIG. 5.

The present invention is not limited to the browser apparatus implemented by a combination of the personal computer and the browser program but may be applied to a combination of an input terminal and a host computer connected to a local area network, an Internet television, or a word processor with communications function having a proper input/output device.

Also, the present invention described in the form of a browser apparatus, an address registering method, and a browser system may be applied to a recording medium which carries a browser software enabling the address registering method.

Although the input device is a mouse in the embodiments, it may be of a pen type.

Although the present invention is explained in the form of a browser apparatus for browsing the homepages of a server on the Internet, it may be applied for browsing various data of servers over a network independent from the Internet.

What is claimed is:

1. A browser apparatus for displaying data supplied from a server over a communication network, comprising:

a display unit having a screen including a first region for displaying said data supplied from said server and a second region for displaying at least one icon image;

a storage for storing a plurality of URL addresses associated with said icon image;

a commander responsive to an action of a user for controlling a location of a pointer displayed on said screen of said display *unit*; and a controller *responsive to a drag-and-drop action of said pointer from an item displayed in said first region of said screen to said second region of said screen to control said storage to store a URL address corresponding to said item in said storage, and* responsive to a selected icon image displayed in said second region, selected by said commander for displaying a pull-down menu having a title list associated with said plurality of URL addresses in said display unit and responsive to a title selected from said pull-down menu by said commander for accessing a URL address associated with said selected title and displaying data supplied from said server corresponding to said accessed URL address in said first region, wherein said icon image is displayed in said second region when said data supplied from said accessed URL address is displayed in said first region.

2. The browser apparatus according to claim 1, wherein said display unit has said second *region* for displaying a plurality of icon images associated with a classification respectively.

3. The browser apparatus according to claim 2, wherein said storage stores a plurality of user named classifications associated with said icon image, each of said classifications assigned to a plurality of URL addresses associated with a respective plurality of data from said server.

4. The browser [appartaus] *apparatus* according to claim 3, wherein a controller *is* responsive to a drag-and-drop action of said pointer for dragging a URL address associated with said data displayed in said first region from said first region of said screen to one of said plurality of said user named classifications displayed as icon images in said second region of said screen and dropping said dragged URL address in one of said plurality of said user name classifications displayed as an icon image in said second region of said screen by said commander [for controlling] *to control* said storage to store said dropped URL address corresponding to said data displayed in said first region in association with said one of said plurality of said user named [classification] *classifications* thereof displayed in said second region.

5. A browsing method comprising the steps of:

displaying data supplied from a server in a first region of a screen of a display unit and displaying an icon image in a second region of said screen;

*storing a URL address corresponding to an item displayed in said first region of said screen in response to a drag-and-drop action of a pointer from said item to said second region of said screen;* selecting said icon image displayed in said second region by [a] *said* pointer;

displaying a pull down menu having a title list associated with a plurality of URL addresses registered in said selected icon image;

selecting a title from said pull down menu;

accessing a URL address associated with said selected title; and displaying data supplied from said server corresponding to said accessed URL address in said first region, wherein said icon image is displayed in said second region when said data supplied from said accessed URL address is displayed in said first region.

6. The browser method according to claim 5, wherein said display unit has said second region for displaying a plurality of icon images associated with a classification respectively.

7. A *non-transitory* storage medium for storing a browser software program, the *browser software* program, *when executed by a processor, causing the processor to perform a method* comprising the steps of:

displaying data supplied from a server in a first region of a screen of a display unit and displaying an icon image in a second region of said screen;

*storing a URL address corresponding to an item displayed in said first region of said screen in response to a drag-and-drop action of a pointer from said item to said second region of said screen;* displaying a pull-down menu having a title list associated with a plurality of URL addresses registered in said icon image displayed in said second region selected by [a] *said* pointer;

accessing a URL address associated with a title selected from said pull-down menu; and displaying data supplied from said server corresponding to said accessed URL address in said first region, wherein said icon image is displayed in said second region when said data supplied from said accessed URL address is displayed in said first region.

8. The storage medium according to claim 7, wherein said display unit has said second region for displaying *a* plurality of icon images associated with a classification respectively.

*9. The browsing method according to claim 5, wherein said pointer is a touch panel.*

*10. The browsing method according to claim 5, wherein the displaying the data supplied from said server corresponding to said accessed URL address comprises displaying image data or text data from said server.*

*11. The browser apparatus according to claim 1, wherein the browser apparatus is connected to a local area network.*

*12. The browser apparatus according to claim 1, wherein the browser apparatus comprises an Internet television function.*

*13. A browser apparatus for displaying data supplied from a server over a communication network, comprising:*

*a screen that displays a first area for displaying said data supplied from said server, a second area for displaying a URL address associated with said data displayed in said first area and a third area for displaying at least one icon image in a pull down menu having a title list associated with a plurality of URL addresses;*

*storing means for storing at least one URL address associated with said icon image;*

*command means for controlling a location of a pointer on said screen according to a user input; and*

*control means for controlling said storing means to store a URL address corresponding to an item displayed in said first area of said screen in response to a drag-and-drop action of said pointer from said item to said third area of said screen, and for controlling said storing means to store a URL address displayed in said second area in association with an icon image displayed in said third area in response to a drag-and-drop action of said pointer from said second area to said icon image displayed in said third area by said command means.*

*14. The apparatus according to claim 13, wherein a tree of a plurality of icon images is displayed in said third area.*

*15. The apparatus according to claim 13, wherein said third area is displayed on a side of said first area, and said second area is displayed on top of said first and third areas.*

*16. The apparatus according to claim 15, wherein said third area is displayed on a left side of said first area.*

*17. The browser apparatus according to claim 13, wherein the browser apparatus is connected to a local area network.*

*18. The browser apparatus according to claim 13, wherein the browser apparatus comprises an Internet television function.*

*19. An address registering method, comprising:*

*displaying, to a screen, a first area for displaying data supplied from a server, a second area for displaying a URL address associated with said data displayed in said first area and a third area for displaying at least one icon image in a pull down menu having a title list associated with a plurality of URL addresses;*

*storing a URL address corresponding to an item displayed in said first area in response to a drag-and-drop action of a pointer from said item to said third area; and*

*storing a URL address displayed in said second area in association with an icon image displayed in said third area in response to a drag-and-drop action of said pointer from said second area to said icon image displayed in said third area.*

*20. The address registering method according to claim 19, wherein said pointer is a touch panel.*

*21. The address registering method according to claim 19, wherein the displaying comprises displaying image data or text data from said server.*

*22. A non-transitory storage medium for storing a browser software program, the browser software program, when executed by a processor, causing the processor to perform a method comprising:*

*displaying, to a screen, a first area for displaying data supplied from a server, a second area for displaying a URL address associated with said data displayed in said first area and a third area for displaying at least one icon image in a pull down menu having a title list associated with a plurality of URL addresses;*

*storing a URL address corresponding to an item displayed in said first area in response to a drag-and-drop action of a pointer from said item to said third area; and*

*storing a URL address displayed in said second area in association with an icon image displayed in said third area in response to a drag-and-drop action of said pointer from said second area to said icon image displayed in said third area.*

*23. A browser apparatus for displaying data supplied from a server over a communication network, comprising:*

*a display device configured to display, with a screen, a first area for displaying said data supplied from said server, a second area for displaying a URL address associated with said data displayed in said first area and a third area for displaying at least one icon image in a pull down menu having a title list associated with a plurality of URL addresses;*

*a storage device configured to store at least one URL address associated with said icon image;*

*a commander device configured to control a location of a pointer on said display device according to a user input; and*

*a controller configured to control said storage device to store a URL address corresponding to an item displayed in said first area of said display device in response to a drag-and-drop action of said pointer from said item to said third area of said display device and to control said storage device to store a URL address displayed in said second area in association with an icon image displayed in said third area in response to a drag-and-drop action of said pointer from said second area to said icon image displayed in said third area by said commander device.*

* * * * *